United States Patent
Kovalick et al.

(10) Patent No.: US 11,453,996 B2
(45) Date of Patent: Sep. 27, 2022

(54) SEALING ASSEMBLY

(71) Applicant: Caterpillar Inc., Peoria, IL (US)

(72) Inventors: Benjamin Kovalick, Decatur, IL (US); Nathaniel K. Harshman, Sullivan, IL (US); Lankesh Mathur Shanmukappa, Decatur, IL (US); Bruce Raymond Vahling, Urbana, IL (US)

(73) Assignee: Caterpillar Inc., Peoria, IL (US)

( * ) Notice: Subject to any disclaimer, the term of this patent is extended or adjusted under 35 U.S.C. 154(b) by 557 days.

(21) Appl. No.: 16/545,152

(22) Filed: Aug. 20, 2019

(65) Prior Publication Data

US 2021/0054594 A1 Feb. 25, 2021

(51) Int. Cl.
*E02F 3/80* (2006.01)
*F16J 15/3284* (2016.01)
*E02F 3/76* (2006.01)

(52) U.S. Cl.
CPC ............... *E02F 3/80* (2013.01); *E02F 3/764* (2013.01); *F16J 15/3284* (2013.01)

(58) Field of Classification Search
CPC .. E02F 3/80; E02F 3/764; E02F 3/3284; F16J 15/3284
See application file for complete search history.

(56) References Cited

U.S. PATENT DOCUMENTS

| | | | | |
|---|---|---|---|---|
| 2,034,141 A * | 3/1936 | Gustafson | ............ | E02F 3/7636 |
| | | | | 74/15.84 |
| 3,273,232 A * | 9/1966 | Royer | ....................... | E02F 9/00 |
| | | | | 29/402.13 |
| 3,888,357 A * | 6/1975 | Bauer | ..................... | F16C 33/60 |
| | | | | 212/175 |
| 4,554,748 A * | 11/1985 | Nixon, Jr. | ............... | F16J 15/16 |
| | | | | 277/545 |
| 7,575,068 B2 * | 8/2009 | Stubben | ............... | E02F 3/7645 |
| | | | | 172/445.2 |
| 8,464,803 B2 * | 6/2013 | Greuel | .................... | E02F 3/765 |
| | | | | 172/795 |
| 8,746,362 B2 | 6/2014 | Bindl et al. | | |
| 8,869,910 B2 * | 10/2014 | Greuel | .................... | E02F 3/844 |
| | | | | 172/792 |
| 9,644,341 B2 | 5/2017 | Yoshimura et al. | | |
| 2015/0135866 A1 | 5/2015 | Staade et al. | | |
| 2015/0329158 A1 | 11/2015 | Busley et al. | | |

FOREIGN PATENT DOCUMENTS

| | | |
|---|---|---|
| CN | 201671125 | 12/2010 |
| CN | 205592354 | 9/2016 |
| CN | 108360589 | 8/2018 |
| JP | 3891470 | 3/2007 |

* cited by examiner

*Primary Examiner* — Jessica H Lutz
(74) *Attorney, Agent, or Firm* — Harrity & Harrity LLP

(57) ABSTRACT

A sealing assembly for a circle member of a motor grader is provided. The sealing assembly includes a plurality of cover segments disposed adjacent to an inner circumference of the circle member. At least one of the plurality of cover segments defines a gap in association with a component disposed adjacent to the at least one of the plurality of cover segments. The sealing assembly also includes a sealing element removably disposed on the at least one of the plurality of cover segments and extending into the gap. The sealing element is adapted to sealingly engage each of the at least one of the plurality of cover segments and the component.

20 Claims, 5 Drawing Sheets

US 11,453,996 B2

SEALING ASSEMBLY

TECHNICAL FIELD

The present disclosure relates to a sealing assembly. More particularly, the present disclosure relates to the sealing assembly for a circle member associated with a motor grader.

BACKGROUND

Grader machines, often referred to as motor graders, are typically used to displace, distribute, mix, and grade a material, such as soil, over a work surface. Grader machines commonly employ a blade assembly coupled to a circle assembly to carry out one or more of these functions. The circle assembly rotates about a rotation axis with respect to the machine and, in turn, rotates the blade assembly with respect to the machine in order to effectively carry out one or more of these functions. The circle assembly includes a ring gear and a pinion gear arrangement to provide rotation of the circle assembly and the blade assembly about the rotation axis.

In many situations, the ring gear and the pinion gear arrangement may be exposed to environment. As such, debris and other unwanted foreign material may enter the circle assembly and deposit on the ring gear and the pinion gear. Accordingly, undesired friction between the ring gear and the pinion gear may increase, in turn, reducing an operable life of the ring gear and the pinion gear. Also, a lubricant, such as grease, deposited on the ring gear and the pinion gear may escape the circle assembly during operation of the machine, in turn, increasing friction between the ring gear and the pinion gear.

In some situations, a sealing arrangement having a cover and/or a seal may be provided around the circle assembly in order to limit exposure of the ring gear and the pinion gear to the environment. However, such a sealing arrangement may include a single, large and bulky cover and/or seal which may be difficult to manufacture and assembly/disassemble from the machine during repairs. Additionally, such a sealing arrangement may have to be manufactured with close tolerances in order to provide accurate mating surfaces, in turn, increasing manufacturing cost of the sealing arrangement. Hence, there is a need for an improved sealing assembly for such applications.

U.S. Patent Application Number 2015/0135866 describes a draft apparatus for a motor grader. The draft apparatus includes a draft frame, a circle, a moldboard, a circle drive, a guard, and a seal. The circle comprises a circle gear. The circle is connected to the draft frame for rotation relative to the draft frame about an axis of the circle gear. The moldboard is mounted to the circle for rotation therewith about the axis. The circle drive is mounted to the draft frame and includes a pinion engaging the circle gear to rotate the circle and the moldboard about the axis. The guard depends from the draft frame in order to provide radial cover of the circle gear and the pinion relative to the axis. The seal establishes a sealed connection between the guard and the circle.

SUMMARY OF THE DISCLOSURE

In an aspect of the present disclosure, a sealing assembly for a circle member of a motor grader is provided. The sealing assembly includes a plurality of cover segments disposed adjacent to an inner circumference of the circle member. At least one of the plurality of cover segments defines a gap in association with a component disposed adjacent to the at least one of the plurality of cover segments. The sealing assembly also includes a sealing element removably disposed on the at least one of the plurality of cover segments and extending into the gap. The sealing element is adapted to sealingly engage each of the at least one of the plurality of cover segments and the component.

In another aspect of the present disclosure, a circle assembly for a motor grader is provided. The circle assembly includes a circle member defining an inner circumference. The circle member is adapted to receive a ring gear therein. The circle assembly also includes a sealing assembly disposed in association with the circle member. The sealing assembly includes a plurality of cover segments disposed adjacent to the inner circumference of the circle member. At least one of the plurality of cover segments defines a gap in association with a component disposed adjacent to the at least one of the plurality of cover segments. The sealing assembly also includes a sealing element removably disposed on the at least one of the plurality of cover segments and extending into the gap. The sealing element is adapted to sealingly engage each of the at least one of the plurality of cover segments and the component.

In yet another aspect of the present disclosure, a motor grader is provided. The motor grader includes a frame and a circle member mounted to the frame. The circle member defines an inner circumference and is adapted to receive a ring gear therein. The motor grader also includes a sealing assembly. The sealing assembly includes a plurality of cover segments disposed adjacent to the inner circumference of the circle member. At least one of the plurality of cover segments defines a gap in association with a component disposed adjacent to the at least one of the plurality of cover segments. The sealing assembly also includes a sealing element removably disposed on the at least one of the plurality of cover segments and extending into the gap. The sealing element is adapted to sealingly engage each of the at least one of the plurality of cover segments and the component.

Other features and aspects of this disclosure will be apparent from the following description and the accompanying drawings.

DETAILED DESCRIPTION

Figure 1:
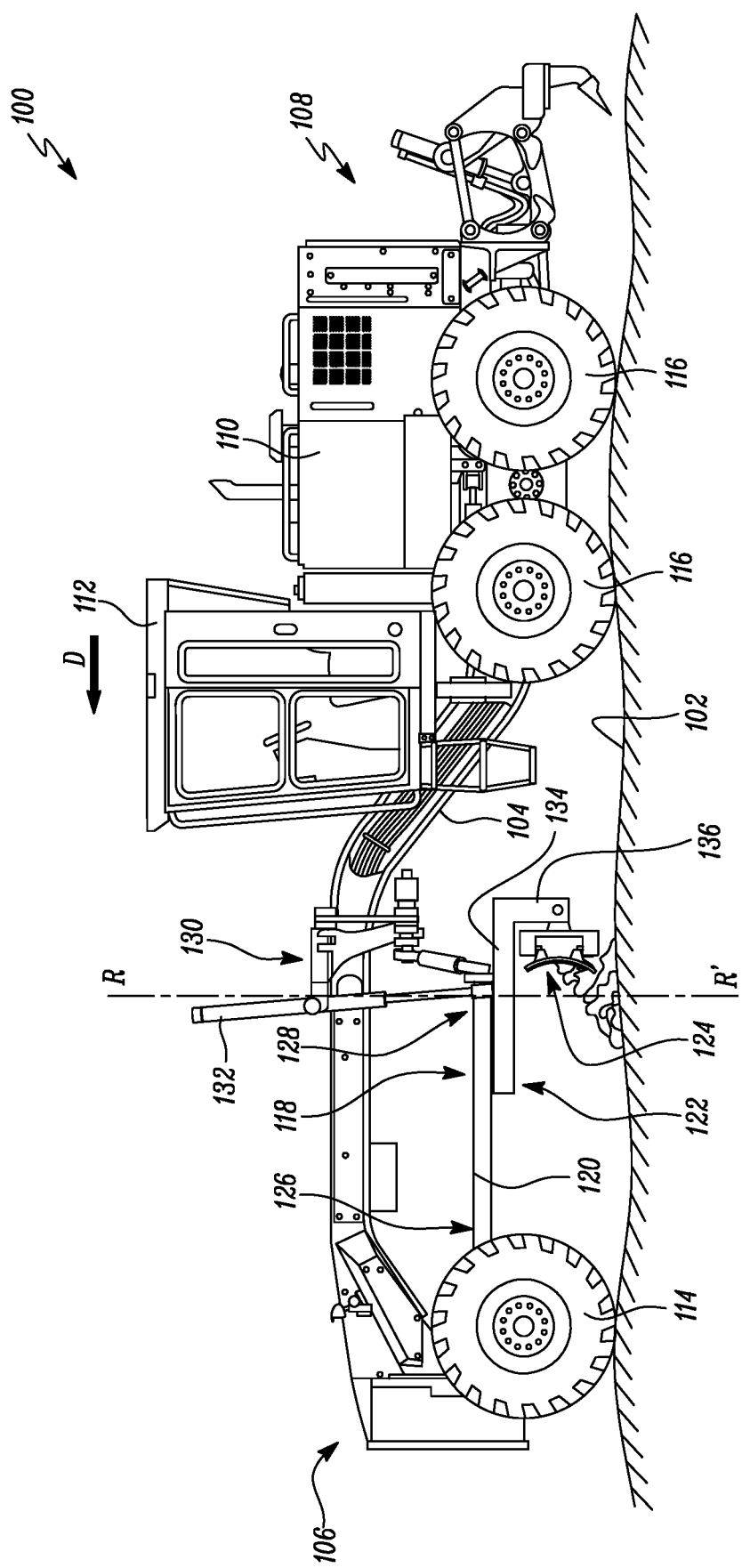
FIG. 1 is a side view of an exemplary motor grader, according to one embodiment of the present disclosure.

Wherever possible, the same reference numbers will be used throughout the drawings to refer to the same or the like parts. Referring to FIG. 1, a side view of an exemplary motor grader 100 is illustrated. The motor grader 100 may be used to displace, spread, distribute, level, and/or grade materials, such as soil, over a work surface 102 during a grading operation. The motor grader 100 includes a frame 104. The frame 104 defines a front end 106 and a rear end 108 with respect to a direction of travel "D" of the motor grader 100. The frame 104 supports one or more components of the motor grader 100. The motor grader 100 includes an enclosure 110 mounted on the frame 104. The enclosure 110 houses a power source (not shown), such as an engine, batteries, and the like, of the motor grader 100. The power source provides power to the motor grader 100 for operational and mobility requirements.

The motor grader 100 includes an operator cabin 112 mounted on the frame 104. The operator cabin 112 includes various controls (not shown), such as a steering, a joystick, an operator console, an operator seat, levers, pedals, buttons, switches, knobs, and the like. The controls are adapted to control the motor grader 100 on the work surface 102. The motor grader 100 includes a set of front wheels 114 and a set of rear wheels 116 rotatably mounted to the frame 104. Each of the front wheels 114 and the rear wheels 116 support and provide mobility to the motor grader 100 on the work surface 102.

The motor grader 100 includes a grader group 118 movably mounted to the frame 104. The grader group 118 is adapted to level and grade material over the work surface 102 during the grading operation. The grader group 118 includes a drawbar 120, a circle assembly 122, and a blade assembly 124. The drawbar 120 includes a first end 126 pivotally coupled to the front end 106 of the frame 104. The drawbar 120 includes a second end 128 movably coupled to a mid-portion 130 of the frame 104 via one or more actuators 132, such as a hydraulic actuator. The actuator 132 may be actuated to raise or lower the second end 128 of the drawbar 120 with respect to the frame 104, in turn, allowing the grader group 118 to be raised or lowered with respect to the work surface 102.

The circle assembly 122 includes a circle member 134 and an arm 136. The circle member 134 rotates with respect to the drawbar 120 about a rotation axis R-R' of the circle member 134. The arm 136 extends from the circle member 134 and rotates with a rotation of the circle member 134 with respect to the drawbar 120 about the rotation axis R-R'. The arm 136 extends from the circle member 134 in an axial direction along the rotation axis R-R'. In the illustrated embodiment, the circle assembly 122 includes a single arm 136. In other embodiments, the circle assembly 122 may include multiple arms 136, such that each of the multiple arms 136 may be disposed spaced apart with respect to one another on the circle member 134. The arm 136 is adapted to movably mount the blade assembly 124 to the frame 104 via the circle member 134 and the drawbar 120. The blade assembly 124 is adapted to engage the work surface 102 during the grading operation.

Figure 2:
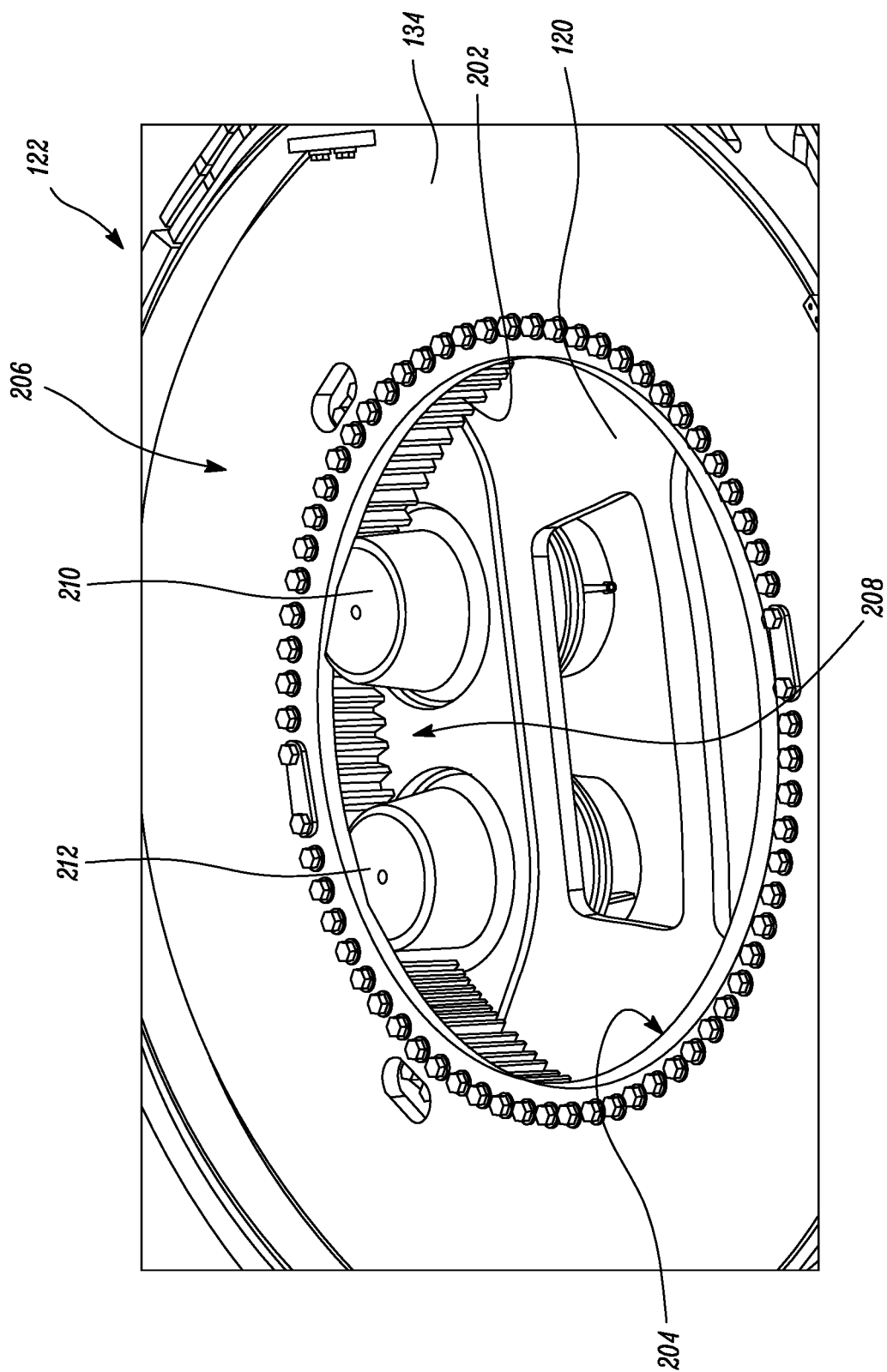
FIG. 2 is a perspective view of a portion of a circle assembly of the motor grader of FIG. 1, according to one embodiment of the present disclosure.

Referring to FIG. 2, a perspective view of a portion of the circle assembly 122 is illustrated. The circle member 134 has a substantially hollow and circular configuration. The circle member 134 is adapted to receive a ring gear 202 therein. The ring gear 202 is coupled to the circle member 134 such that the circle member 134 rotates about the rotation axis R-R' based on a rotation of the ring gear 202. The circle member 134 defines an inner circumference 204 and an outer surface 206 extending away from the inner circumference 204. The circle assembly 122 also includes an opening 208 defined between the circle member 134 and the drawbar 120. The opening 208 provides an access to the ring gear 202 disposed within the circle member 134. The circle member 134 may be manufactured using any metal or alloy, such as steel, and so on, based on application requirements. Also, the circle member 134 may be manufactured using any process, such as casting, forging, fabrication, additive manufacturing, and so on, based on application requirements.

The circle assembly 122 also includes a number of pinion covers 210, 212. Each of the pinion covers 210, 212 is coupled to the drawbar 120 and disposed adjacent to the opening 208 and the inner circumference 204 of the circle member 134. Each of the pinion covers 210, 212 is adapted to receive a pinion gear (not shown) therein. In the illustrated embodiment, the circle assembly 122 includes two pinion gears and two pinion covers 210, 212. In other embodiments, the circle assembly 122 may include single or multiple pinion gears and associated pinion covers. Each of the pinion gears is adapted to mesh with the ring gear 202. Accordingly, based on a rotation of each of the pinion gears, the ring gear 202 and the circle member 134 are adapted to rotate about the rotation axis R-R.

Figure 3:
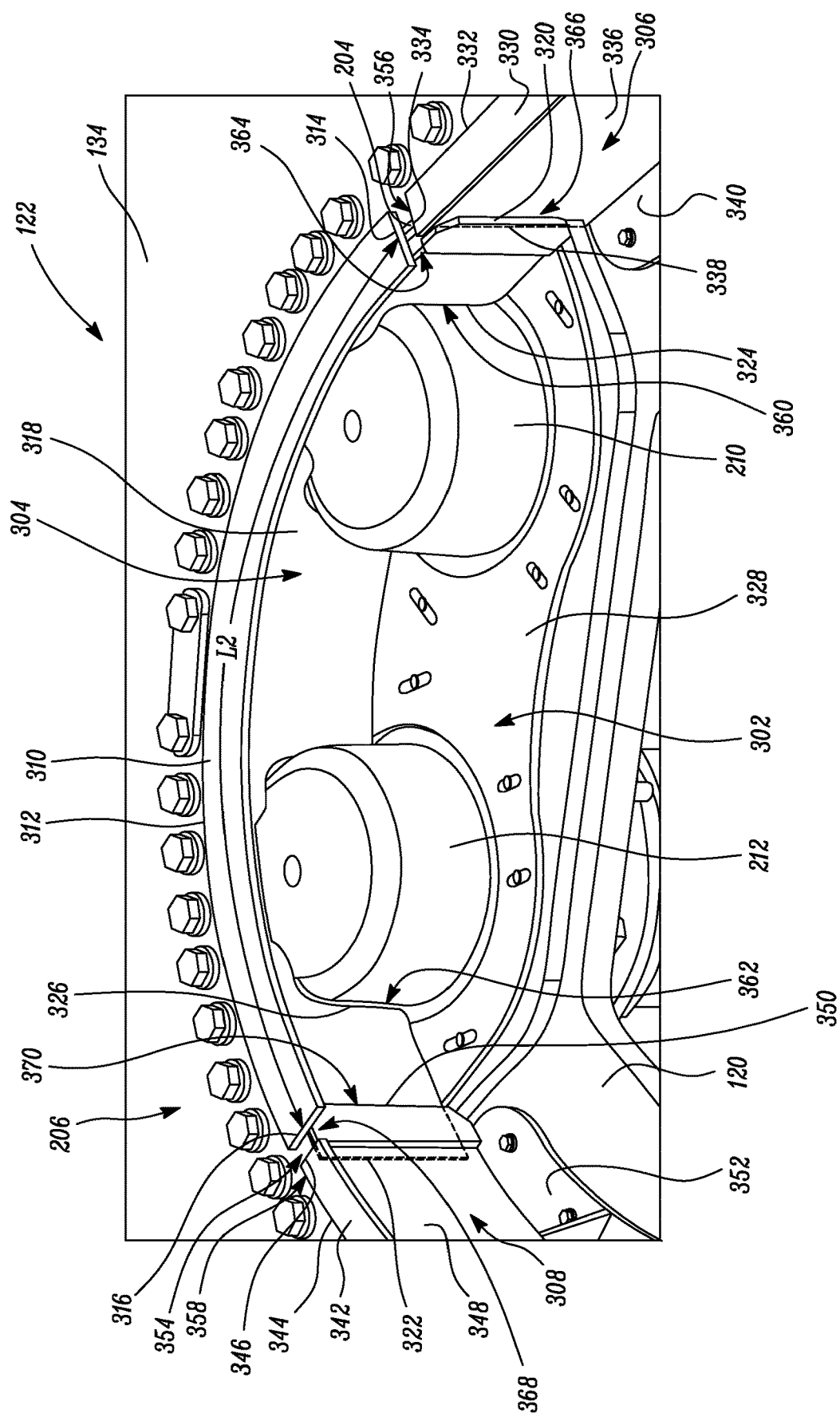
FIG. 3 is a perspective view showing cover segments assembled on a portion of the circle assembly of FIG. 2, according to one embodiment of the present disclosure.

Referring to FIG. 3, another perspective view of a portion of the circle assembly 122 is illustrated. As shown in the accompanying figure, the circle assembly 122 further includes a sealing assembly 302. The sealing assembly 302 will be hereinafter interchangeably referred to as the "assembly 302". The assembly 302 is adapted to sealingly enclose the opening 208 and the ring gear 202 within the circle assembly 122. As such, the assembly 302 is adapted to limit entry of debris, such as soil, mud, rock particles, foreign material, and so on, within the circle assembly 122 through the opening 208, and, thus, limit accumulation of debris within the circle member 134, the ring gear 202, and the pinion gears.

The assembly 302 includes a plurality of cover segments disposed adjacent to the inner circumference 204 of the circle member 134. In the illustrated embodiment, the plurality of cover segments includes a first cover segment 304, a second cover segment 306, and a third cover segment 308. The first cover segment 304 will be hereinafter interchangeably referred to as the "first cover 304". The second cover segment 306 will be hereinafter interchangeably referred to as the "second cover 306". The third cover segment 308 will be hereinafter interchangeably referred to as the "third cover 308". In the accompanying figure, only three cover segments of the assembly 302 are shown. It should be noted that, in other embodiments, the assembly 302 may include single or multiple cover segments, based on application requirements. Each of the first cover 304, the second cover 306, and the third cover 308 may be manufactured using any metal or alloy, such as steel, and so on, based on application requirements. Also, each of the first cover 304, the second cover 306, and the third cover 308 may be manufactured using any process, such as casting, forging, fabrication, additive manufacturing, and so on, based on application requirements.

Each of the first cover 304, the second cover 306, and the third cover 308 has a substantially arcuate configuration based on a circular configuration of the inner circumference 204 of the circle member 134. The first cover 304 includes a first top plate 310 defining a first curved edge 312, a first side edge 314, and a second side edge 316. The first side edge 314 is disposed adjacent to the first curved edge 312 and substantially perpendicular to the first curved edge 312. In other embodiments, the first side edge 314 may be disposed at any angle relative to the first curved edge 312. The second side edge 316 is disposed opposite to the first side edge 314. The second side edge 316 is disposed adjacent to the first curved edge 312 and substantially perpendicular to the first curved edge 312. In other embodiments, the second side edge 316 may be disposed at any angle relative to the first curved edge 312.

The first cover 304 also includes a first front plate 318. The first front plate 318 extends away from the first top plate 310 and is disposed substantially perpendicular to the first top plate 310. The first front plate 318 defines a first lateral edge 320, a second lateral edge 322, a first internal edge 324, and a second internal edge 326. The first lateral edge 320 is disposed adjacent to the first side edge 314 and substantially perpendicular to the first side edge 314. In other embodiments, the first lateral edge 320 may be disposed at any angle relative to the first side edge 314. The second lateral edge 322 is disposed opposite to the first lateral edge 320. The second lateral edge 322 is disposed adjacent to the second side edge 316 and substantially perpendicular to the second side edge 316. In other embodiments, the second lateral edge 322 may be disposed at any angle relative to the second side edge 316.

The first internal edge 324 and the second internal edge 326 are disposed adjacent to one another. Also, each of the first internal edge 324 and the second internal edge 326 is defined between the first lateral edge 320 and the second lateral edge 322. Each of the first internal edge 324 and the second internal edge 326 has a substantially stepped configuration and will be explained in more detail later.

The first cover 304 also includes a first bottom plate 328. The first bottom plate 328 extends away from the first front plate 318 and is disposed substantially perpendicular to the first front plate 318. The first bottom plate 328 is adapted to mount the first cover 304 adjacent to the circle member 134. More specifically, the first bottom plate 328 is removably coupled to the drawbar 120 in a manner such that the first top plate 310 extends adjacent to the outer surface 206 of the circle member 134, and the first front plate 318 extends adjacent to the inner circumference 204 of the circle member 134, the opening 208, and each of the pinion covers 210, 212. Accordingly, the first front plate 318 is adapted to partially close the opening 208 defined between the circle member 134 and the drawbar 120.

The second cover 306 includes a second top plate 330 defining a second curved edge 332, a third side edge 334, and a fourth side edge (not shown). The third side edge 334 is disposed adjacent to the second curved edge 332 and substantially perpendicular to the second curved edge 332. In other embodiments, the third side edge 334 may be disposed at any angle relative to the second curved edge 332. The fourth side edge may be disposed opposite to the third side edge 334. The fourth side edge may be disposed adjacent to the second curved edge 332 and substantially perpendicular to the second curved edge 332. In other embodiments, the fourth side edge may be disposed at any angle relative to the second curved edge 332.

The second cover 306 also includes a second front plate 336. The second front plate 336 extends away from the second top plate 330 and is disposed substantially perpendicular to the second top plate 330. The second front plate 336 defines a third lateral edge 338 and a fourth lateral edge (not shown). The third lateral edge 338 is disposed adjacent to the third side edge 334 and substantially perpendicular to the third side edge 334. In other embodiments, the third lateral edge 338 may be disposed at any angle relative to the third side edge 334. The fourth lateral edge may be disposed opposite to the third lateral edge 338. Also, the fourth lateral edge may be disposed adjacent to the fourth side edge and substantially perpendicular to the fourth side edge.

The second cover 306 also includes a second bottom plate 340. The second bottom plate 340 extends away from the second front plate 336 and is disposed substantially perpendicular to the second front plate 336. The second bottom plate 340 is adapted to mount the second cover 306 adjacent to the circle member 134 and the first cover 304. More specifically, the second bottom plate 340 is removably coupled to the drawbar 120 in a manner such that the second top plate 330 extends adjacent to the outer surface 206 of the circle member 134, and the second front plate 336 extends adjacent to the inner circumference 204 of the circle member 134 and the opening 208. Accordingly, the second front plate 336 is adapted to partially close the opening 208 defined between the circle member 134 and the drawbar 120.

The third cover 308 includes a third top plate 342 defining a third curved edge 344, a fifth side edge 346, and a sixth side edge (not shown). The fifth side edge 346 is disposed adjacent to the third curved edge 344 and substantially perpendicular to the third curved edge 344. In other embodiments, the fifth side edge 346 may be disposed at any angle relative to the third curved edge 344. The sixth side edge may be disposed opposite to the fifth side edge 346. The sixth side edge may be disposed adjacent to the third curved edge 344 and substantially perpendicular to the third curved edge 344.

The third cover 308 also includes a third front plate 348. The third front plate 348 extends away from the third top plate 342 and is disposed substantially perpendicular to the third top plate 342. The third front plate 348 defines a fifth lateral edge 350 and a sixth lateral edge (not shown). The fifth lateral edge 350 is disposed adjacent to the fifth side edge 346 and substantially perpendicular to the fifth side edge 346. In other embodiments, the fifth lateral edge 350 may be disposed at any angle relative to the fifth side edge 346. The sixth lateral edge may be disposed opposite to the fifth lateral edge 350. Also, the sixth lateral edge may be disposed adjacent to the sixth side edge and substantially perpendicular to the sixth side edge.

The third cover 308 also includes a third bottom plate 352. The third bottom plate 352 extends away from the third front plate 348 and is disposed substantially perpendicular to the third front plate 348. The third bottom plate 352 is adapted to mount the third cover 308 adjacent to the circle member 134 and the first cover 304. More specifically, the third bottom plate 352 is removably coupled to the drawbar 120 in a manner such that the third top plate 342 extends adjacent to the outer surface 206 of the circle member 134, and the third front plate 348 extends adjacent to the inner circumference 204 of the circle member 134 and the opening 208. Accordingly, the third front plate 348 is adapted to partially close the opening 208 defined between the circle member 134 and the drawbar 120.

In an assembled position of the plurality of cover segments, at least one of the plurality of cover segments defines a gap in association with a component disposed adjacent to the at least one of the plurality of cover segments. In one embodiment, the component is the circle member 134. For example, in one situation, in an assembled position of the first cover 304 adjacent to the circle member 134, the first top plate 310 defines a first gap 354 between the first top plate 310 and the outer surface 206 of the circle member 134. In an assembled position of the second cover 306 adjacent to the circle member 134 and the first cover 304, the second cover 306 defines a second gap 356 between the second top plate 330 and the outer surface 206 of the circle member 134. In an assembled position of the third cover 308 adjacent to the circle member 134 and the first cover 304, the third cover 308 defines a third gap 358 between the third top plate 342 and the outer surface 206 of the circle member 134.

In another embodiment, the component is the pinion cover 210, 212 of the pinion gear associated with the circle assembly 122. For example, in the assembled position of the first cover 304 adjacent to the circle member 134, the first front plate 318 defines a fourth gap 360 between the first internal edge 324 and the pinion cover 210. Also, the first front plate 318 defines a fifth gap 362 between the second internal edge 326 and the pinion cover 212.

In another embodiment, the component is the adjacent cover segment of the plurality of cover segments. For example, in one situation, in the assembled position of the second cover 306 adjacent to the first cover 304, the first top plate 310 defines a sixth gap 364 between the first side edge 314 and the third side edge 334 of the second top plate 330 of the second cover 306. Also, the first front plate 318 defines a seventh gap 366 between the first lateral edge 320 and the third lateral edge 338 of the second front plate 336 of the second cover 306. In another situation, in the assembled position of the third cover 308 adjacent to the first cover 304, the first top plate 310 defines an eighth gap 368 between the second side edge 316 and the fifth side edge 346 of the third top plate 342 of the third cover 308. Also, the first front plate 318 defines a ninth gap 370 between the second lateral edge 322 and the fifth lateral edge 350 of the third front plate 348 of the third cover 308.

It should be noted that although nine different gaps have been described herein relative to each of the first cover 304, the second cover 306, and the third cover 308, in other embodiments, the circle assembly 122 may include single or multiple gaps between adjacent cover segments of the plurality of cover segments, the circle member 134, and/or each of the pinion covers 210, 212. For example, in some embodiments, single or multiple gaps may be formed between adjacent edges of the first cover 304, the second cover 306, and/or the third cover 308, based on an actual configuration of respective adjacent edges of the first cover 304, the second cover 306, and/or the third cover 308. In some embodiments, single or multiple gaps may be formed between edges of each of the first cover 304, the second cover 306, the third cover 308, and the circle member 134, based on an actual configuration of respective edges of the first cover 304, the second cover 306, and/or the third cover 308. In some embodiments, single or multiple gaps may be formed between edges of the first cover 304 and each of the pinion covers 210, 212, based on an actual configuration of respective edges of the first cover 304.

Figure 4:
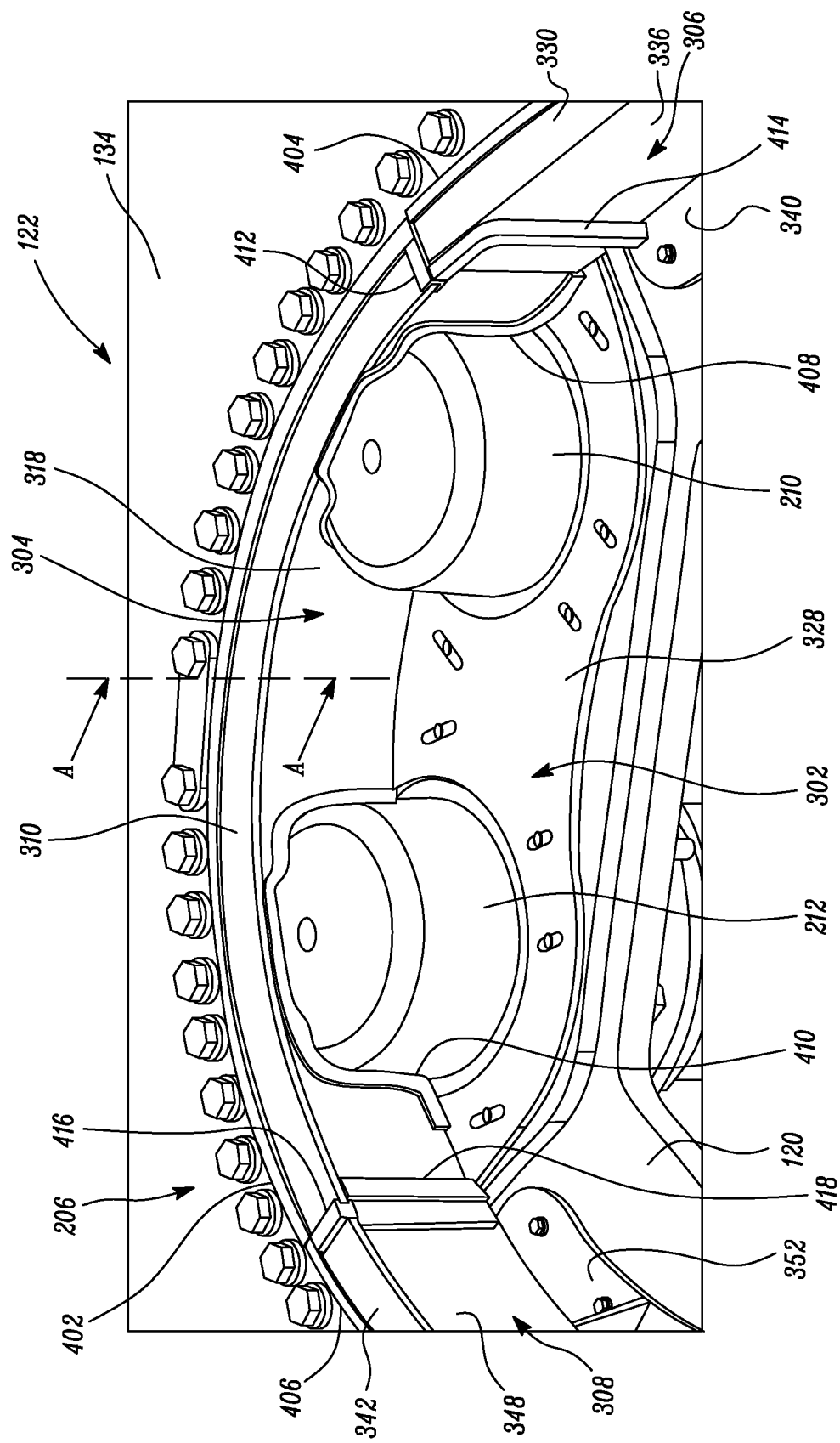
FIG. 4 is a perspective view showing sealing elements assembled on the circle assembly of FIG. 3, according to one embodiment of the present disclosure.

Referring to FIG. 4, the assembly 302 also includes a sealing element removably disposed on the at least one of the plurality of cover segments and extends into the gap. The sealing element is adapted to sealingly engage each of the at least one of the plurality of cover segments and the component. In the illustrated embodiment, the assembly 302 includes a number of sealing elements, such as a first sealing element 402, a second sealing element 404, a third sealing element 406, a fourth sealing element 408, a fifth sealing element 410, a sixth sealing element 412, a seventh sealing element 414, an eighth sealing element 416, and a ninth sealing element 418.

The first sealing element 402 will be hereinafter interchangeably referred to as the "first seal 402". The first seal 402 is removably disposed in the first gap 354. The second sealing element 404 will be hereinafter interchangeably referred to as the "second seal 404". The second seal 404 is removably disposed in the second gap 356. The third sealing element 406 will be hereinafter interchangeably referred to as the "third seal 406". The third seal 406 is removably disposed in the third gap 358. The fourth sealing element 408 will be hereinafter interchangeably referred to as the "fourth seal 408". The fourth seal 408 is removably disposed in the fourth gap 360.

The fifth sealing element 410 will be hereinafter interchangeably referred to as the "fifth seal 410". The fifth seal 410 is removably disposed in the fifth gap 362. The sixth sealing element 412 will be hereinafter interchangeably referred to as the "sixth seal 412". The sixth seal 412 is removably disposed in the sixth gap 364. The seventh sealing element 414 will be hereinafter interchangeably referred to as the "seventh seal 414". The seventh seal 414 is removably disposed in the seventh gap 366. The eighth sealing element 416 will be hereinafter interchangeably referred to as the "eighth seal 416". The eighth seal 416 is removably disposed in the eighth gap 368. The ninth sealing element 418 will be hereinafter interchangeably referred to as the "ninth seal 418". The ninth seal 418 is removably disposed in the ninth gap 370.

The sealing element will now be explained with reference to the first seal 402. Referring to FIG. 5A, a perspective view of the first seal 402 is illustrated. In the illustrated embodiment, the first seal 402 has a substantially U-shaped configuration defining a thickness "T" and a length "L1" thereof. As such, the first seal 402 defines a groove 502 extending along the length "L1" of the first seal 402. The groove 502 is adapted to removably receive an edge of the at least one of the plurality of cover segments therein. More specifically, in the illustrated embodiment, the groove 502 is adapted to receive the first curved edge 312 of the first top plate 310 of the first cover 304.

In the illustrated embodiment, the thickness "T" is approximately equal along the length "L1" and a cross section of the first seal 402. In other embodiments, the thickness "T" may vary along the length "L1" and/or the cross section of the first seal 402. Also, the thickness "T" of the first seal 402 is at least equal to a width "W" (shown in FIG. 5B) of the first gap 354. Further, the length "L1" is approximately equal to a length "L2" (shown in FIG. 3) of the first curved edge 312. It should be noted that the configuration of the first seal 402 described herein is merely exemplary and may vary. For example, in other embodiments, the first seal 402 may have any other configuration, such as an L-shaped configuration, a T-shaped configuration, an angled configuration, a stepped configuration, a circular configuration, an elliptical configuration, and so on, based on application requirements. The first seal 402 may be manufactured using any material, such as a plastic, a polymer, an elastomer, and so on, and/or a combination thereof. Also, the first seal 402 may be manufactured using any process, such as molding, extrusion, and so on, based on application requirements.

Figure 5B:
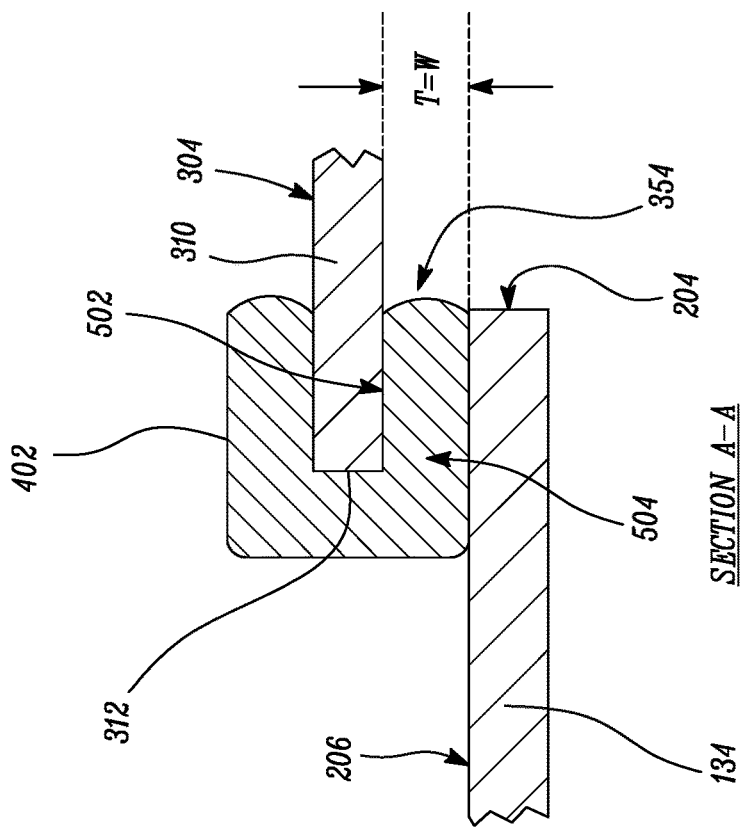
FIG. 5B is a cross sectional view of a portion of the circle assembly of FIG. 4 along a section A-A, according to one embodiment of the present disclosure.
Figure 5A:
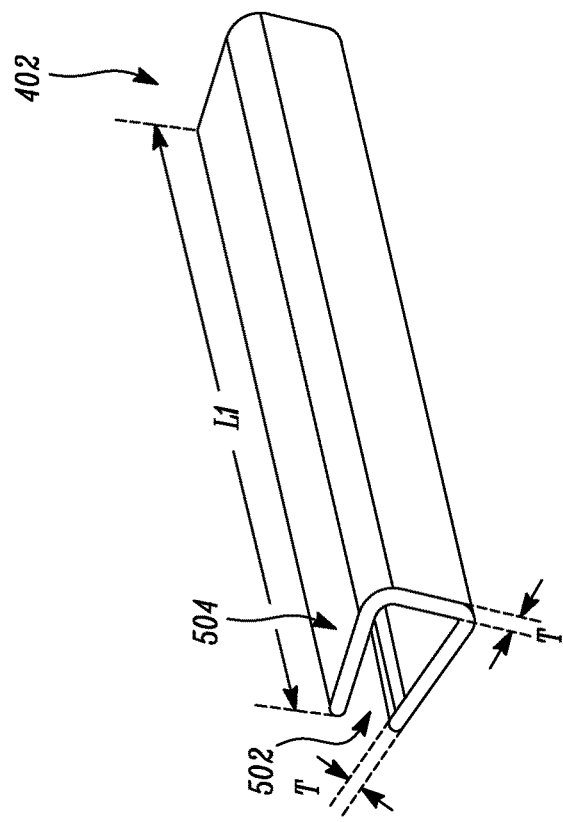
FIG. 5A is a perspective of an exemplary sealing element of FIG. 4, according to one embodiment of the present disclosure.

Referring to FIG. 5B, a cross sectional view of a portion of the assembly 302 along a section A-A (shown in FIG. 4) is illustrated. In an assembled position of the first seal 402, the first curved edge 312 of the first top plate 310 of the first cover 304 is received in the groove 502. More specifically, the first seal 402 is snap fitted on the first curved edge 312 along the length "L2" of the first curved edge 312. Accordingly, a portion 504 of the first seal 402 is disposed in the first gap 354 between the first top plate 310 and the outer surface 206 of the circle member 134. In many situations, the thickness "T" of the first seal 402 may be greater than the width "W" of the first gap 354. In such a situation, the portion 504 of the first seal 402 received in the first gap 354 may be compressed in order to provide an effective sealing and self-retention of the first seal 402 between the first top plate 310 and the circle member 134.

It should be noted that although the sealing element is described herein with reference to the first seal 402, other sealing elements such as each of the second seal 404, the third seal 406, the fourth seal 408, the fifth seal 410, the sixth seal 412, the seventh seal 414, the eighth seal 416, and the ninth seal 418 may have a cross sectional configuration substantially similar to a cross sectional configuration of the first seal 402. Also, each of the second seal 404, the third seal 406, the fourth seal 408, the fifth seal 410, the sixth seal 412, the seventh seal 414, the eighth seal 416, and the ninth seal 418 may be snap fitted on respective edge and in respective gap in a manner similar to that described with reference to the first seal 402 and the first gap 354.

Further, dimensions of each of the second seal 404, the third seal 406, the fourth seal 408, the fifth seal 410, the sixth seal 412, the seventh seal 414, the eighth seal 416, and the ninth seal 418 may be based on dimensions of the respective edge or gap associated with the respective seal. Accordingly, in one situation, the second seal 404 may be snap fitted on the second curved edge 332 such that a length of the second seal 404 may be approximately equal to a length of the second curved edge 332, and a thickness of the second seal 404 may be at least equal to a width of the second gap 356. In another situation, the third seal 406 may be snap fitted on the third curved edge 344 such that a length of the third seal 406 may be approximately equal to a length of the third curved edge 344, and a thickness of the third seal 406 may be at least equal to a width of the third gap 358.

In another situation, the fourth seal 408 may be snap fitted on the first internal edge 324 such that a length of the fourth seal 408 may be approximately equal to a length of the first internal edge 324, and a thickness of the fourth seal 408 may be at least equal to a width of the fourth gap 360. In another situation, the fifth seal 410 may be snap fitted on the second internal edge 326 such that a length of the fifth seal 410 may be approximately equal to a length of the second internal edge 326, and a thickness of the fifth seal 410 may be at least equal to a width of the fifth gap 362. In another situation, the sixth seal 412 may be snap fitted on the first side edge 314 or the third side edge 334 such that a length of the sixth seal 412 may be approximately equal to a length of the first side edge 314 or the third side edge 334, respectively, and a thickness of the sixth seal 412 may be at least equal to a width of the sixth gap 364.

In another situation, the seventh seal 414 may be snap fitted on the first lateral edge 320 or the third lateral edge 338 such that a length of the seventh seal 414 may be approximately equal to a length of the first lateral edge 320 or the third lateral edge 338, respectively, and a thickness of the seventh seal 414 may be at least equal to a width of the seventh gap 366. In another situation, the eighth seal 416 may be snap fitted on the second side edge 316 or the fifth side edge 346 such that a length of the eighth seal 416 may be approximately equal to a length of the second side edge 316 or the fifth side edge 346, respectively, and a thickness of the eighth seal 416 may be at least equal to a width of the eighth gap 368. In another situation, the ninth seal 418 may be snap fitted on the second lateral edge 322 or the fifth lateral edge 350 such that a length of the ninth seal 418 may be approximately equal to a length of the second lateral edge 322 or the fifth lateral edge 350, respectively, and a thickness of the ninth seal 418 may be at least equal to a width of the ninth gap 370.

INDUSTRIAL APPLICABILITY

The present disclosure relates to the sealing assembly 302 for the circle assembly 122 of the motor grader 100. During assembly of the sealing assembly 302 on the circle assembly 122, the sealing elements are removably disposed on the respective edges of the respective cover elements. For example, the first seal 402 is removably snap fitted on the first curved edge 312 of the first cover 304 as described with reference to FIG. 5B. Similarly, the second seal 404 is removably snap fitted on the second curved edge 332 of the second cover 306. The third seal 406 is removably snap fitted on the third curved edge 344 of the third cover 308. The fourth seal 408 is removably snap fitted on the first internal edge 324 of the first cover 304.

The fifth seal 410 is removably snap fitted on the second internal edge 326 of the first cover 304. The sixth seal 412 is removably snap fitted on the first side edge 314 of the first cover 304 or the third side edge 334 of the second cover 306. The seventh seal 414 is removably snap fitted on the first lateral edge 320 of the first cover 304 or the third lateral edge 338 of the second cover 306. The eighth seal 416 is removably snap fitted on the second side edge 316 of the first cover 304 or the fifth side edge 346 of the third cover 308. The ninth seal 418 is removably snap fitted on the second lateral edge 322 of the first cover 304 or the fifth lateral edge 350 of the third cover 308. Further, each of the first cover 304, the second cover 306, and the third cover 308 is removably coupled to the drawbar 120. Accordingly, each of the first cover 304, the second cover 306, and the third cover 308 closes the opening 208 between the circle member 134 and the drawbar 120.

Accordingly, upon assembly, the first seal 402 is disposed in the first gap 354 in order to sealingly close the first gap 354. The second seal 404 is disposed in the second gap 356 in order to sealingly close the second gap 356. The third seal 406 is disposed in the third gap 358 in order to sealingly close the third gap 358. The fourth seal 408 is disposed in the fourth gap 360 in order to sealingly close the fourth gap 360. The fifth seal 410 is disposed in the fifth gap 362 in order to sealingly close the fifth gap 362. The sixth seal 412 is disposed in the sixth gap 364 in order to sealingly close the sixth gap 364. The seventh seal 414 is disposed in the seventh gap 366 in order to sealingly close the seventh gap 366. Also, the eighth seal 416 is disposed in the eighth gap 368 in order to sealingly close the eighth gap 368. Further, the ninth seal 418 is disposed in the ninth gap 370 in order to sealingly close the ninth gap 370.

The sealing assembly 302 provides a simple, efficient, and cost-effective method to sealingly enclose the circle member 134 and, thus, limit entry of unwanted debris into the circle member 134, the ring gear 202, and the pinion gears. Additionally, the sealing assembly 302 may provide improved retention of a lubricant around the ring gear 202 and the pinion gear. As such, the sealing assembly 302 may reduce wear and increase an operable life of the ring gear 202 and the pinion gears. The sealing elements of the sealing assembly 302 may be readily available, off-the-shelf components, in turn, reducing complexity and costs.

Further, the sealing elements may be easily replaced when damaged. More specifically, one or more sealing elements may be selectively replaced in case of damage by disassembling respective cover segments, in turn, reducing replacement costs, service time, machine downtime, and labor effort. The sealing assembly 302 may be retrofitted on any circle assembly 122 with little or no modification to the existing system, in turn, improving flexibility and compatibility. Further, the sealing elements are self-retaining, positively retained seals that requiring no additional tools or retaining members, in turn, reducing complexity, cost, and labor effort.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A sealing assembly for a circle member of a motor grader, the sealing assembly comprising:
    a plurality of cover segments overlapping one another to cover an inner circumference of the circle member, at least one of the plurality of cover segments defining a gap in association with a component disposed adjacent to the at least one of the plurality of cover segments; and
    a sealing element removably disposed on the at least one of the plurality of cover segments and extending into the gap, the sealing element adapted to sealingly engage each of the at least one of the plurality of cover segments and the component.

2. The sealing assembly of claim 1, wherein the component is an adjacent cover segment of the plurality of cover segments.

3. The sealing assembly of claim 1, wherein the component is a pinion cover of a pinion gear associated with the circle member.

4. The sealing assembly of claim 1, wherein the component is the circle member.

5. The sealing assembly of claim 1, wherein the sealing element includes a groove extending along a length of the sealing element, the groove adapted to removably receive an edge of the at least one of the plurality of cover segments therein.

6. The sealing assembly of claim 1, wherein the sealing element is snap fitted on an edge of the at least one of the plurality of cover segments.

7. The sealing assembly of claim 6, wherein a length of the sealing element is approximately equal to a length of the edge of the at least one of the plurality of cover segments.

8. The sealing assembly of claim 1, wherein a thickness of the sealing element is at least equal to a width of the gap.

9. The sealing assembly of claim 1, wherein the sealing element is made of one of a plastic, a polymer, or an elastomer.

10. A circle assembly for a motor grader, the circle assembly comprising:
    a circle member defining an inner circumference, the circle member adapted to receive a ring gear therein; and
    a sealing assembly disposed in association with the circle member, the sealing assembly comprising:
        a plurality of cover segments overlapping one another to cover the inner circumference of the circle member, at least one of the plurality of cover segments defining a gap in association with a component disposed adjacent to the at least one of the plurality of cover segments; and
        a sealing element removably disposed on the at least one of the plurality of cover segments and extending into the gap, the sealing element adapted to sealingly engage each of the at least one of the plurality of cover segments and the component.

11. The circle assembly of claim 10, wherein the component is an adjacent cover segment of the plurality of cover segments.

12. The circle assembly of claim 10, wherein the component is a pinion cover of a pinion gear associated with the circle assembly.

13. The circle assembly of claim 10, wherein the component is the circle member of the circle assembly.

14. The circle assembly of claim 10, wherein the sealing element includes a groove extending along a length of the sealing element, the groove adapted to receive an edge of the at least one of the plurality of cover segments therein.

15. The circle assembly of claim 10, wherein the sealing element is snap fitted on an edge of the at least one of the plurality of cover segments.

16. The circle assembly of claim 15, wherein a length of the sealing element is approximately equal to a length of the edge of the at least one of the plurality of cover segments.

17. The circle assembly of claim 10, wherein a thickness of the sealing element is at least equal to a width of the gap.

18. The circle assembly of claim 10, wherein the sealing element is made of one of a plastic, a polymer, or an elastomer.

19. A motor grader comprising:
    a frame;
    a circle member mounted to the frame, the circle member defining an inner circumference, the circle member adapted to receive a ring gear therein; and
    a sealing assembly disposed in association with the circle member, the sealing assembly comprising:
        a plurality of cover segments overlapping one another to cover the inner circumference of the circle member, at least one of the plurality of cover segments defining a gap in association with a component disposed adjacent to the at least one of the plurality of cover segments; and
        a sealing element removably disposed on the at least one of the plurality of cover segments and extending into the gap, the sealing element adapted to sealingly engage each of the at least one of the plurality of cover segments and the component.

20. The motor grader of claim 19, wherein the component is at least one of an adjacent cover segment of the plurality of cover segments, a pinion cover of a pinion gear, or the circle member.

* * * * *